(12) United States Patent
Guo et al.

(10) Patent No.: US 11,210,159 B2
(45) Date of Patent: Dec. 28, 2021

(54) FAILURE DETECTION AND CORRECTION IN A DISTRIBUTED COMPUTING SYSTEM

(71) Applicant: International Business Machines Corporation, Armonk, NY (US)

(72) Inventors: Ying Zhao Guo, Palatine, IL (US); Jason Resch, Chicago, IL (US); Niall John McShane, Chicago, IL (US); Akiko Sato, Palatine, IL (US); Patrick Aaron Tamborski, Chicago, IL (US); Gregory A. Papadopoulos, Hickory Hills, IL (US); Praveen Viraraghavan, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 24 days.

(21) Appl. No.: 16/734,820

(22) Filed: Jan. 6, 2020

(65) Prior Publication Data
US 2021/0208962 A1 Jul. 8, 2021

(51) Int. Cl.
*G06F 11/00* (2006.01)
*G06F 11/07* (2006.01)
*G06F 11/34* (2006.01)

(52) U.S. Cl.
CPC ........ *G06F 11/0793* (2013.01); *G06F 11/008* (2013.01); *G06F 11/0709* (2013.01); *G06F 11/0727* (2013.01); *G06F 11/0751* (2013.01); *G06F 11/3452* (2013.01)

(58) Field of Classification Search
CPC .............. G06F 11/0793; G06F 11/008; G06F 11/0709; G06F 11/0727; G06F 11/0751; G06F 11/3452
See application file for complete search history.

(56) References Cited

U.S. PATENT DOCUMENTS

| | | | |
|---|---|---|---|
| 9,015,324 B2 | 4/2015 | Jackson | |
| 9,300,548 B2 | 3/2016 | Asthana et al. | |
| 9,400,960 B2 | 7/2016 | Clements et al. | |
| 9,451,025 B2* | 9/2016 | Kazi | G06F 3/0683 |
| 9,798,605 B2* | 10/2017 | Hofig | G06F 11/079 |
| 10,599,512 B2* | 3/2020 | Aiyar | G06F 11/0709 |
| 2017/0118288 A1* | 4/2017 | Baptist | G06F 16/27 |

* cited by examiner

Primary Examiner — Katherine Lin
(74) Attorney, Agent, or Firm — Andrew Aubert

(57) ABSTRACT

A failure detection and correction module (FDCM) uses statistical measurement to detect failures in a distributed computing system caused by hardware, software, workflow, deployment, environmental factors, etc. in a component of the computing system, the computing system, or multiple computing systems and produces corrective actions. The FDCM identifies issues from various components, correlates the estimated failures in each level of components and rolls up failures and estimated failures from each level of components to system level estimations of failures, reevaluates the system reliability factors, readjusts the system reliability and system functions from the adjusted reliability factors, and produces intelligent corrective actions to improve both system reliability and the system efficiency. Corrective action includes changing slice storing parameters and rebuild priorities on a dispersed storage system.

18 Claims, 8 Drawing Sheets

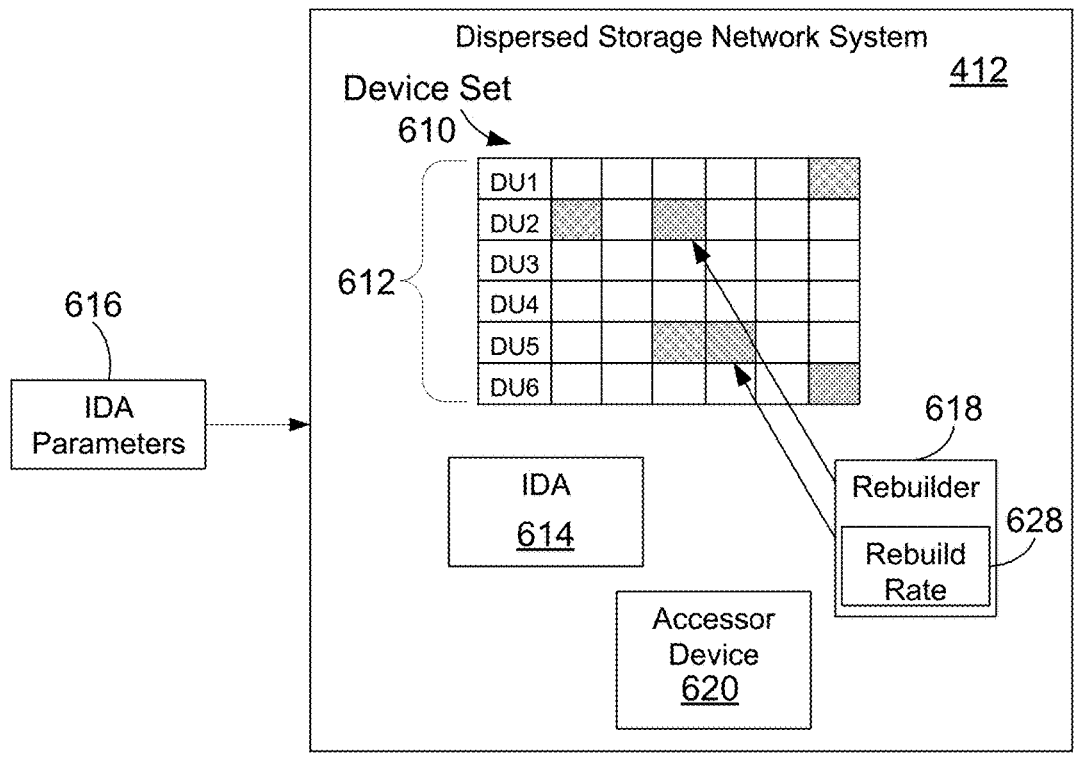
FIG. 6A
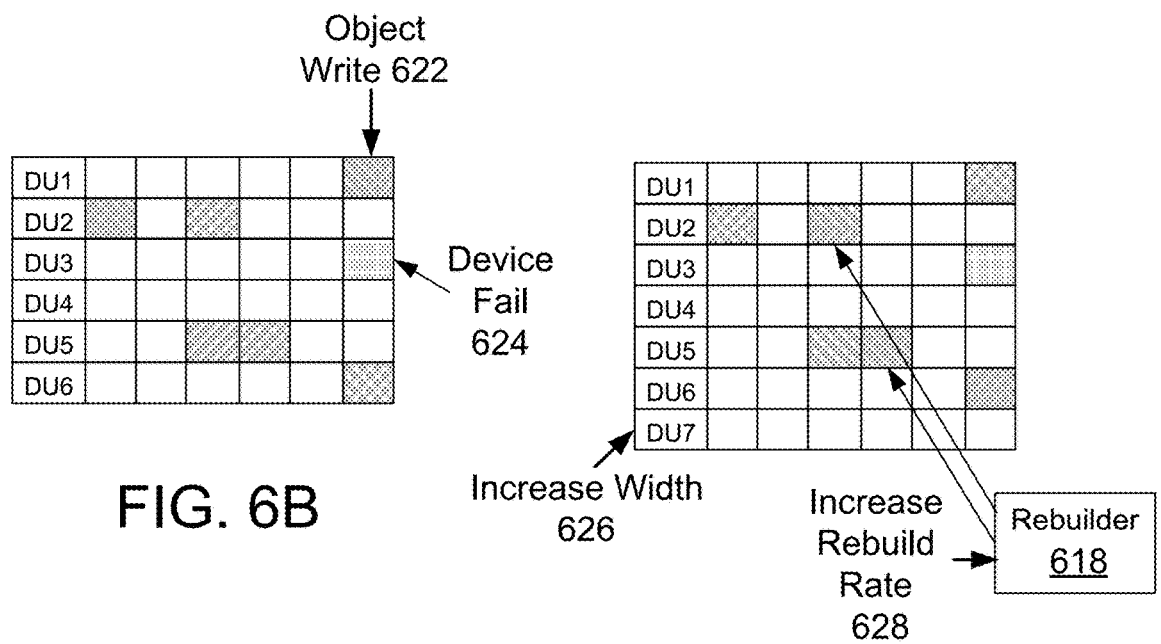
FIG. 6B
FIG. 6C

| Corrective Actions When Reliability is High |
|---|
| 1. Issue alerts
2. Reduce replication/mirroring count or enable asynchronous writes and defer syncing.
3. Change IDA Parameters. IDA width, rebuilding threshold, reduce the write threshold, or increase IDA threshold.
4. Change Priorities: reduce the rebuilder priority or increase client priority.
5. Change hardware |

FIG. 7A

| Corrective Actions When Reliability is Low |
|---|
| 1. Issue alerts.
2. Perform diagnostics.
3. Increase replication/mirroring count, trigger sync, force synchronous writes in mirrored configurations
4. Change IDA Parameters. IDA width, Number of Devices, increase write threshold; increase the deferred rebuilding threshold; reduce IDA Threshold.
5. Change Priorities: increase the prioritization of rebuilding activity; increase the prioritization of sync activity; decrease client priority; defer system maintenance.
6. Change hardware. |

FIG. 7B

| Corrective Actions When A Subset of the Population Has a Problem |
|---|
| 1. Initiate a replacement of the problem component subset.
2. Initiate upgrade or downgrade of the affected software/firmware.
3. If no suitable software/firmware is available: replace the component or take corrective actions that might be taken when system reliability is too low.
4. Workload or workflow: initiate alerts of a potentially damaging workload; throttle, restrict, reduce, redirect, schedule, or delay the requests causing damage to the components; reprioritize tasks to reduce the impact of the workload.
5. Set an attribute of the subset as an indicator for predicting higher failure rates in other populations.
6. Physical location: monitor/review/analyze environmental conditions; redirect requests away from that location; initiate a migration of components, or their data. |

FIG. 7C

FAILURE DETECTION AND CORRECTION IN A DISTRIBUTED COMPUTING SYSTEM

BACKGROUND

1. Technical Field

This disclosure generally relates to failure detection and correction in a distributed computing system, and more specifically relates to failure detection and correction in a distributed computing system including a dispersed storage network to improve system reliability and efficiency.

2. Background Art

Computing systems communicate data, process data, and/or store data. Computing systems include devices that range from wireless smart phones, laptops, tablets, personal computers, workstations, and video game devices, to large data centers that support web searches, stock trades, or on-line purchases. In general, a computing system includes a central processing unit (CPU), a memory system, user input/output interfaces, peripheral device interfaces, and an interconnecting bus structure.

A computing system may effectively extend its processing capability by using "cloud computing" or distributed computing to perform one or more computing functions (e.g., a service, an application, an algorithm, an arithmetic logic function, etc.) on behalf of the computing system. For large services, applications, and/or functions, cloud computing may be performed by multiple cloud computing resources in a distributed manner to improve the response time for completion of the service, application, and/or function. In addition to cloud computing, a computing system may use "cloud storage" as part of its memory system. Cloud storage enables a user, via a computing system, to store files, applications, etc., on a dispersed storage system or dispersed storage network system. The dispersed storage system may include a RAID (redundant array of independent disks) system and/or a dispersed storage system that uses an error correction scheme for data storage. Failure detection and correction in a distributed computing system including a dispersed storage network system can be used to improve both system reliability and system efficiency.

BRIEF SUMMARY

A failure detection and correction module (FDCM) uses statistical measurement to detect failures in a distributed computing system caused by hardware, software, workflow, deployment, environmental factors, etc. in a component of the computing system, the computing system, or multiple computing systems and produces corrective actions. The FDCM identifies issues from various components, correlates the estimated failures in each level of components and rolls up failures and estimated failures from each level of components to system level estimations of failures, reevaluates the system reliability factors, readjusts the system reliability and system functions from the adjusted reliability factors, and produces intelligent corrective actions to improve both system reliability and the system efficiency. Corrective action includes changing slice storing parameters and rebuild priorities on a dispersed storage system.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIGS. 6A-6C illustrate an example of taking corrective action on a dispersed storage network system;

FIGS. 7A-7C illustrate examples of taking corrective action on a dispersed storage network system;

Figure 8:
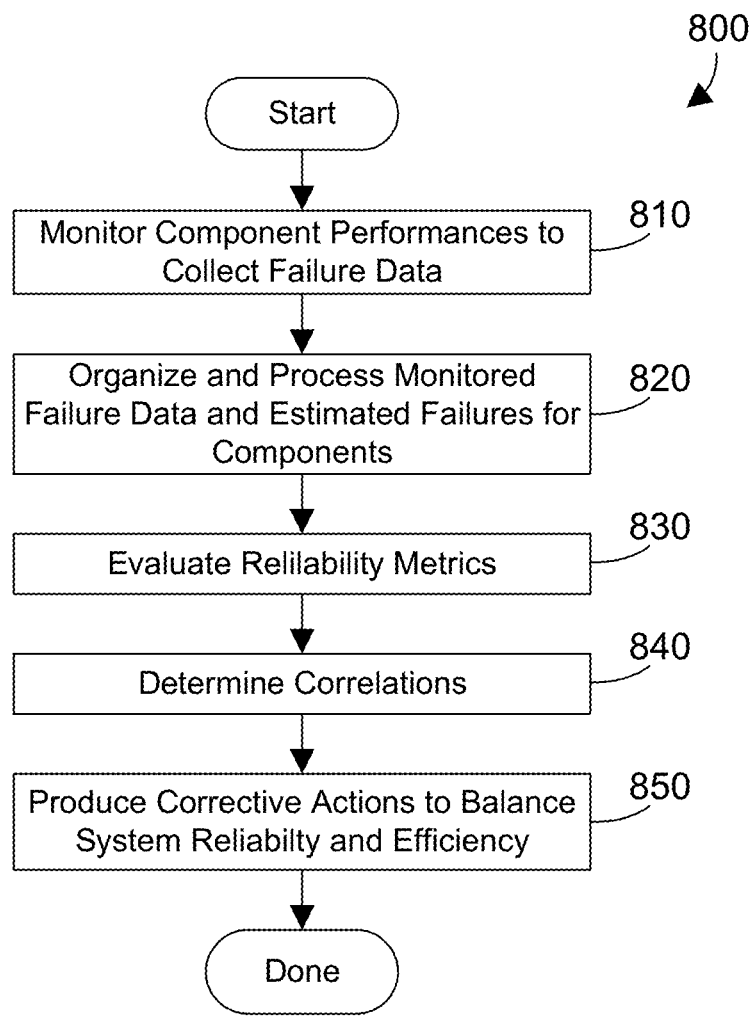
FIG. 8 is a flow diagram of a method for detecting failures in a distributed computing system caused by hardware, software, workflow, deployment, and environmental factors in a component of the computing system.
Figure 9:
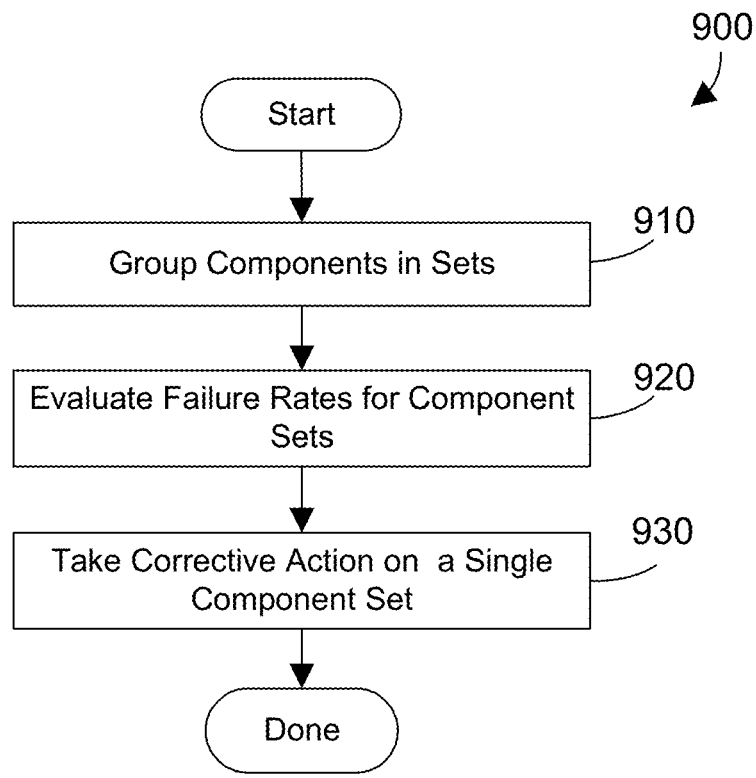
Figure 10:
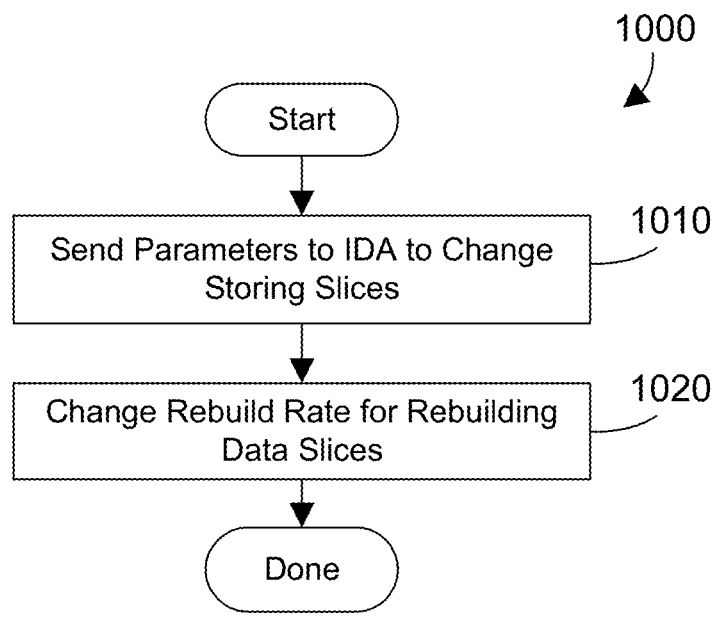

FIG. 9 is a flow diagram of an example method for organizing and processing monitored failure data and estimated failures for components in step 820 of FIG. 8; and FIG. 10 is a flow diagram of an example method for evaluating reliability metrics and producing corrective actions to balance system reliability and efficiency in steps 830 and 850 of FIG. 8.

DETAILED DESCRIPTION

The disclosure and claims herein relate to failure detection and correction in a dispersed data storage system. The system includes a failure detection and correction module (FDCM) that uses statistical measurement to detect failures in a distributed computing system caused by hardware, software, workflow, deployment, environmental factors, etc. in a component of the computing system, the computing system, or multiple computing systems and produces corrective actions. The FDCM identifies issues from various components, correlates the estimated failures in each level of components and rolls up failures and estimated failures from each level of components to system level estimations of failures, reevaluates the system reliability factors, readjusts the system reliability and system functions from the adjusted reliability factors, and produces intelligent corrective actions to improve both system reliability and the system efficiency. Corrective action includes changing slice storing parameters and rebuild priorities on a dispersed storage system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
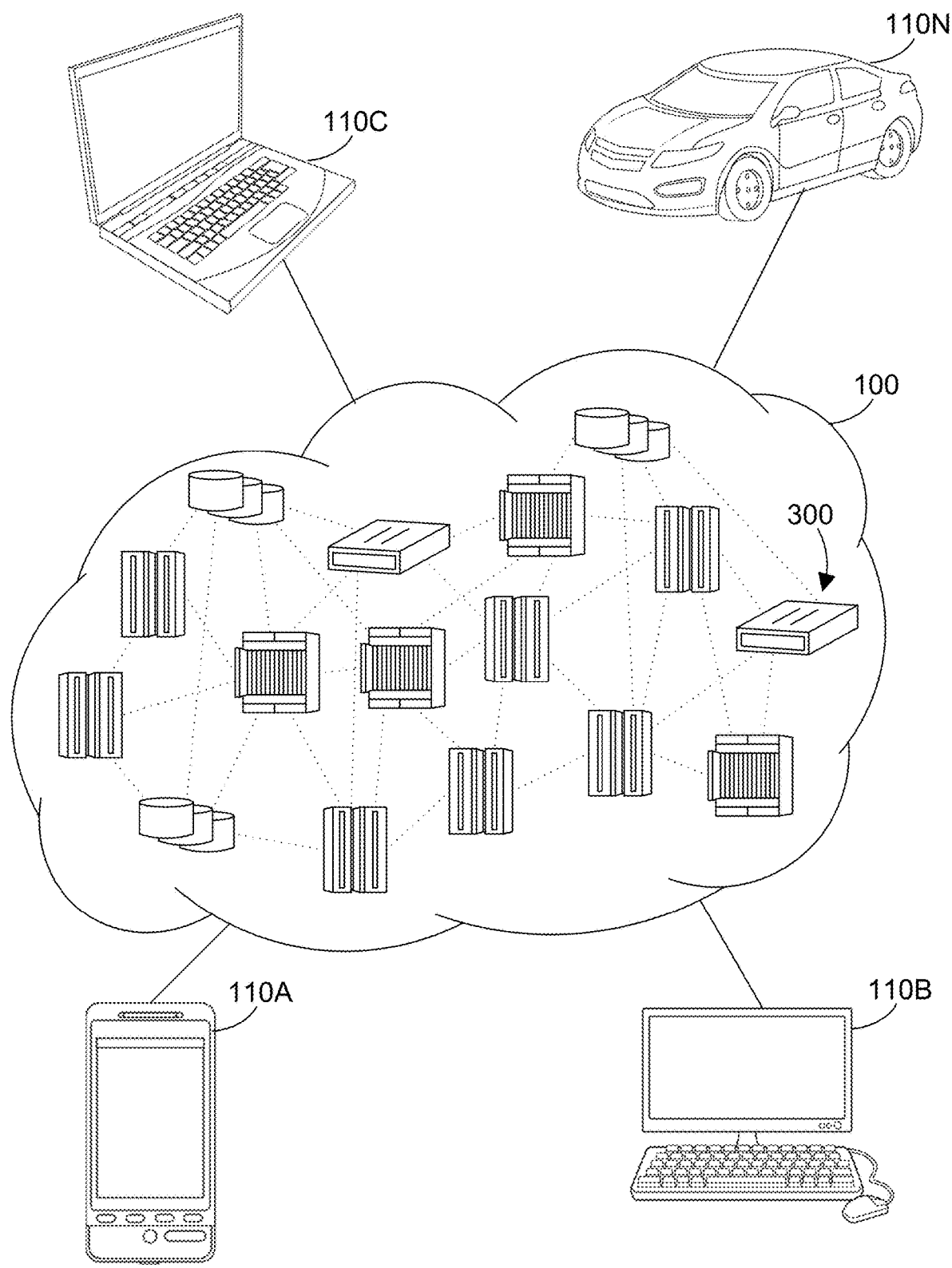
FIG. 1 is a block diagram of a cloud computing environment.

Referring now to FIG. 1, illustrative cloud computing environment 100 is depicted. As shown, cloud computing environment 100 comprises one or more cloud computing nodes 300 with which local computing devices used by cloud consumers, such as, for example, personal digital assistant (PDA) or cellular telephone 110A, desktop computer 110B, laptop computer 110C, and/or automobile computer system 110N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 100 to offer infrastructure, platforms and/or software as services for which a cloud consumer does not need to maintain resources on a local computing device. It is understood that the types of computing devices 110A-N shown in FIG. 1 are intended to be illustrative only and that computing nodes 300 and cloud computing environment 100 can communicate with any type of computerized device over any type of network and/or network addressable connection (e.g., using a web browser).

Figure 2:
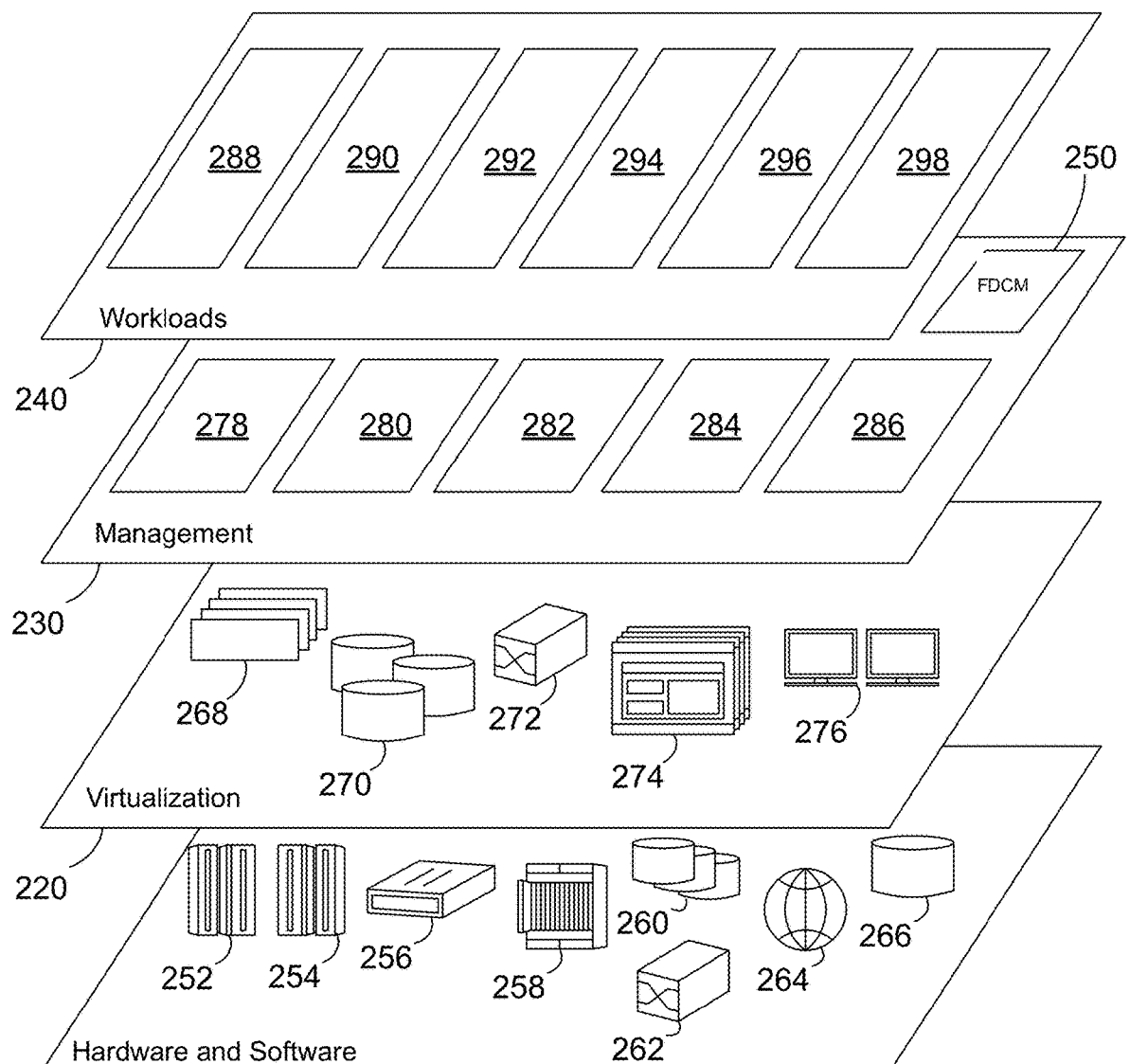
FIG. 2 is a block diagram of abstraction model layers.

Referring now to FIG. 2, a set of functional abstraction layers provided by cloud computing environment 100 (FIG. 1) is shown. It should be understood in advance that the components, layers, and functions shown in FIG. 2 are intended to be illustrative only and the disclosure and claims are not limited thereto. As depicted, the following layers and corresponding functions are provided.

Hardware and software layer 210 includes hardware and software components. Examples of hardware components include mainframes 252; RISC (Reduced Instruction Set Computer) architecture based servers 254; servers 256; blade servers 258; storage devices 260; and networks and networking components 262. In some embodiments, software components include network application server software 264 and database software 266.

Virtualization layer 220 provides an abstraction layer from which the following examples of virtual entities may be provided: virtual servers 268; virtual storage 270; virtual networks 272, including virtual private networks; virtual applications and operating systems 274; and virtual clients 276.

In one example, management layer 230 may provide the functions described below. Resource provisioning 278 provides dynamic procurement of computing resources and other resources that are utilized to perform tasks within the cloud computing environment. Metering and Pricing 280 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 282 provides access to the cloud computing environment for consumers and system administrators. Service level management 284 provides cloud computing resource allocation and management such that required service levels are met. Service Level Agreement (SLA) planning and fulfillment 286 provide pre-arrangement for, and procurement of, cloud computing resources for which a future requirement is anticipated in accordance with an SLA. The management layer further includes a failure detection and correction module (FDCM) 250 as described herein. While the FDCM 250 is shown in FIG. 2 to reside in the management layer 230, the FDCM 250 actually may span other levels such as the applications layer 240 shown in FIG. 2 as needed.

Workloads layer 240 provides examples of functionality for which the cloud computing environment may be utilized. Examples of workloads and functions which may be provided from this layer include: mapping and navigation 288; software development and lifecycle management 290; virtual classroom education delivery 292; data analytics processing 294; transaction processing 296 and mobile desktop 298.

Figure 3:
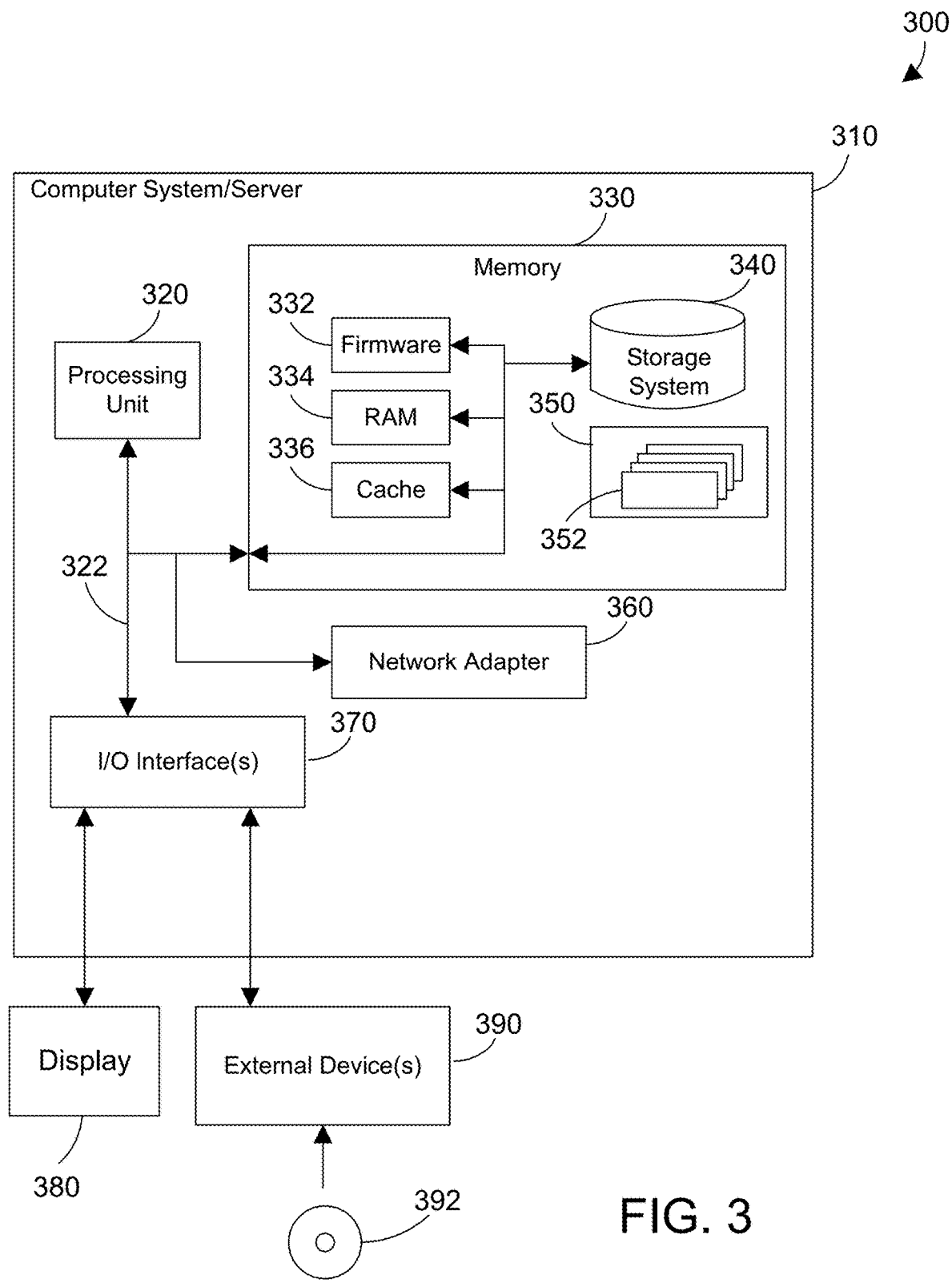
FIG. 3 is a block diagram of a cloud computing node.

Referring now to FIG. 3, a block diagram of an example of cloud computing node 300 introduced in FIG. 1 is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 310, which is operational with numerous other general purpose or special purpose computing system environments or configurations. Examples of well-known computing systems, environments, and/or configurations that may be suitable for use with computer system/server 310 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 310 may be described in the general context of computer system executable instructions, such as program modules, being executed by a computer system. Generally, program modules may include routines, programs, objects, components, logic, data structures, and so on that perform particular tasks or implement particular abstract data types. Computer system/server 310 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 310 in cloud computing node 300 is shown in the form of a general-purpose computing device. The components of computer system/server 310 may include, but are not limited to, one or more processors or processing units 320, a system memory 330, and a bus 322 that couples various system components including system memory 330 to processor 320.

Bus 322 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System memory 330 can include computer system readable media in the form of non-volatile memory, such as firmware 332, or volatile memory, such as random access memory (RAM) 334, and/or cache memory 336. Computer system/server 310 may further include other removable/non-removable, volatile/non-volatile computer system storage media. By way of example only, storage system 340 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 322 by one or more data media interfaces. As will be further depicted and described below, memory 330 may include at least one program product having a set (e.g., at least one) of program modules that are configured to carry out the functions described in more detail below.

Program/utility 350, having a set (at least one) of program modules 352, may be stored in memory 330 by way of example, and not limitation, as well as an operating system, one or more application programs, other program modules, and program data. Each of the operating system, one or more application programs, other program modules, and program data or some combination thereof, may include an implementation of a networking environment. Program modules 352 generally carry out the functions and/or methodologies of embodiments of the invention as described herein.

Computer system/server 310 may also communicate with one or more external devices 390 such as a keyboard, a pointing device, a display 380, a disk drive, etc.; one or more devices that enable a user to interact with computer system/server 310; and/or any devices (e.g., network card, modem, etc.) that enable computer system/server 310 to communicate with one or more other computing devices. Such communication can occur via Input/Output (I/O) interfaces 370. Still yet, computer system/server 310 can communicate with one or more networks such as a local area network (LAN), a general wide area network (WAN), and/or a public network (e.g., the Internet) via network adapter 360. As depicted, network adapter 360 communicates with the other components of computer system/server 310 via bus 322. It should be understood that although not shown, other hardware and/or software components could be used in conjunction with computer system/server 310. Examples, include, but are not limited to: microcode, device drivers, redundant processing units, external disk drive arrays, RAID systems, tape drives, data archival storage systems, etc.

Definitions as Used Herein

Component—An element of a computing system which can fail. For example, a memory device (disk, SSD, tape), network card, CPU, motherboard, etc.

Failure Rate (FR)—A failure rate for a given component type is a statistical measurement of the expected number of failures of that type over a given period of time.

Mean Time (To/Between) Failure (MTBF or MTTF)—The inverse of a failure rate. All of the estimates of the FR described herein apply equally to computing or estimating a mean time to failure.

Annual Failure Rate (AFR)—An annual failure rate is the failure rate of a given component type over one year. For example, the AFR of a component is 5% (or 0.05) means one can expect 5% of a population of those components to fail over one year.

Estimated Failure Rate (EFR)—The estimated failure rate is a statistical estimate of an AFR based on the observed numbers of failures of a given component type over a bounded period. The bounded period may be defined by a given number of observed failures, or a fixed period of time over which the observation took place. Since the EFR is a statistical measure, an EFR may be computed as a range of possible values for a given level of confidence. For example, with 95% confidence, we might estimate an EFR to be between 3% and 5% over one year.

Subset EFR (SEFR)—A Subset EFR or SEFR is an EFR for a given component type but one that is estimated from failure rate observation data from a subset of the total population of those components. The subset is determined by distinguishing categories, including, but not limited to: workflows applied to the component, workload of those components (DSN memory, vault, storage pool) they belong to, manufacture or installation date (drive manufacture date, model number, device set membership, physical location (site/region) of the component, firmware or software versions of the component, etc.

Potential EFR (PEFR)—A Potential EFR or PEFR is an EFR for a given component type that is computed counting both confirmed as well as potential failures as observed failures. This results in a potentially overestimated EFR, and is valuable when it is expensive, difficult, time consuming, or otherwise difficult to distinguish genuine failures from potential ones. It enables corrective actions to be taken without delaying for the confirmation of potential failures of a component. For example, a disk that becomes extremely slow may be failing or it may just need to be reseated/reset, but it might be many days before for someone can physically reseat the drive. One alternative for computing a PEFR is to count a potential failure as a fractional value (between 0 and 1) when counting the number of failures that have been observed. This fraction may be related to the confidence in the failure being a genuine failure. For example, if a condition is observed which historically has been a genuine failure 50% of the time, a PEFR calculation may count this condition as "0.5" of a failure. That is, if there have been 3 confirmed failures, and one of these potential failure conditions, the PEFR would be computed as the EFR in the case that there have been 3.5 observed failures. h) Subset Potential EFR (SPEFR)—A PEFR computed from a subset of the component population.

(S)(P)EFR Range—An EFR (or SEFR, PEFR, or SPEFR as applicable) Range is an interval centered around an EFR (or SEFR, PEFR, or SPEFR as applicable) which defines a lower-bound and upper-bound based on a given confidence level. The EFR range can be computed from failure data while the sample size of the failures and population size feed into setting the tightness of the bounds and/or the level of confidence. There exist various methods for computing the upper or lower bounds of the EFR range, using time-truncated or failure-truncated formulas.

Figure 4:
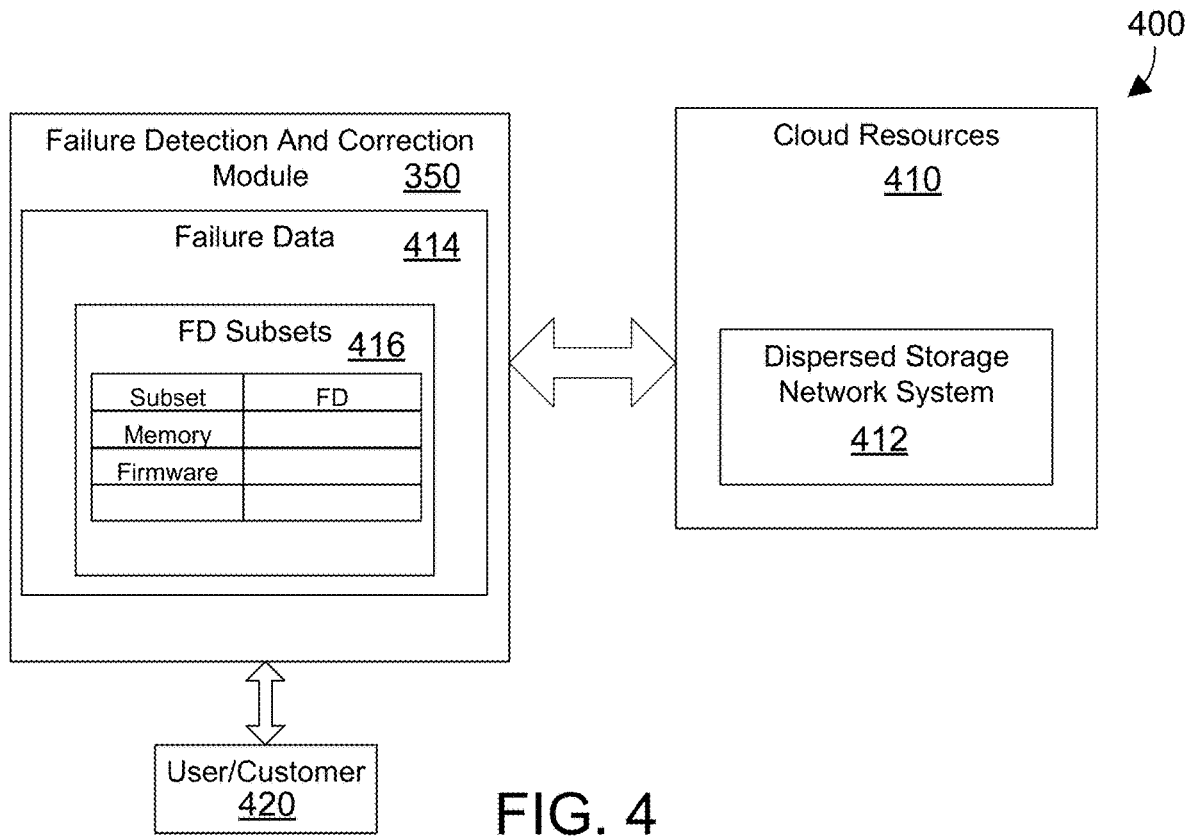
FIG. 4 is a block diagram showing an example of a system for failure detection and correction as described herein.

FIG. 4 shows one suitable example of system 400 for failure detection and corrective action as described herein. The system 400 includes a failure and detection and correction module (FDCM) 250 executing on a computer system such as in the management layer 330 shown in FIG. 3. The FDCM 250 communicates and interacts with cloud resources 410 of a distributed computing system. The cloud resources 410 include a dispersed storage network system 412. The FDCM 250 includes failure data 414 that is collected and estimated on components of the system as described below. The failure data 414 may include failure data divided into subsets of components 416 as described herein. The FDCM 250 can be accessed and controlled by a user/customer 420.

Again referring to FIG. 4, the failure detection and corrective module (FDCM) 250 uses statistical measurement to detect failures in a distributed computing system caused by hardware, software, workflow, deployment, environmental factors, etc. in a component of the computing system, the computing system, or multiple computing systems, and produces corrective actions. The FDCM identifies issues from various components, correlates the estimated failures in each level of components and rolls up failures and estimated failures from each level of components to system level estimations of failures, reevaluates the system reliability factors, readjusts the system reliability and system functions from the adjusted reliability factors, and produces intelligent corrective actions to improve both system reliability and the system efficiency.

Figure 5:
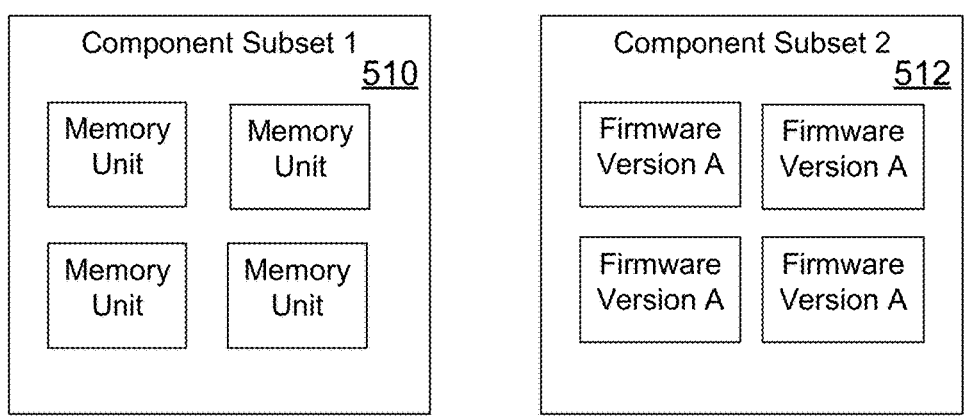
FIG. 5 illustrates a simplified diagram of dividing the system into component subsets.

FIG. 5 illustrates two examples of component subsets which can be monitored and analyzed to produce failure data stored in FD subsets 416 shown in FIG. 4. Component subset 1 510 is a collection of memory units that have a common characteristic as further described below. Component subset 2 512 is a collection of firmware units with a common version (for example, "Version A"). Subsets of other components could also be used.

Monitoring Performance to Collect Failure Data: To derive an EFR, two categories of information are typically collected: the cumulative component time in operation and the cumulative component failure count. The first category of information represents the number of components in the system times a time unit. For example, "device hours", where 5 components in operation for one day would represents 5*24=120 device hours. The second category of information is a raw (or adjusted) count of the number of observed failures of those components within that bounded window of observation, e.g., a count of the number of failures within that 24 hours observation window that included 120 device hours. This value may be adjusted up or down by considering levels of confidence for unconfirmed failures. For example, if a component exhibits abnormal behavior that is indicative of a potential failure, the adjusted number of failures can be adjusted upwards to account for this. This is typically done to compute a PEFR. If a suspected failure is later determined to have not been genuine (e.g., the component was successfully recovered), then the PEFR will be lowered. Given that failure rate conditions may change over time, some trade off may be made between completeness of observational data and recency/relevancy of the observed results. A faulty environmental condition, such as elevated temperature, or after a software/firmware upgrade, may lead to an immediate and sharp spike in the failure rate of the components. Yet, if this new failure rate data is averaged over a history of many years, the EFR may barely budge. On the other hand, if the range of past failures considered in the calculation is bounded, for example by only considering the past 60 days, or only considering the past 20 failures, the EFR can respond more rapidly to actual changes in the failure rate. Note however that the less observational data is used, the less statistical confidence there is for the EFR and the larger the range for the EFR for a under a given confidence level. Therefore, some amount of trade off must be selected for between recency and statistical confidence. The sample size (population size of the components under observation) and failure rate of those components also factor into the amount of data that can be collected within a given period of time. To bias towards recency of data, several mechanisms might be used, including a weighted moving average (e.g., exponential moving average), a rolling average (hard cut off by time or hard cut off by failure count), or other similar techniques. The system may make adjustments to these recency parameters based on the sample size, failure rates, and desired level of recency bias, and a desired degree of statistical soundness.

Organizing Failure Data: An EFR or PEFR can be determined for a total population of components or on subsets of the population. Finding EFR or PEFR for subsets of components can identify problematic localized environmental conditions, workflows, workloads, firmware, or software. For example, in the whole system, 99% of components may use firmware version A and have a failure rate of 2% per year, while 1% of those components use firmware version B and have a failure rate of 20% per year. Viewed in aggregate, the AFR of this population of components would appear healthy, only (99%*2%+1%*20%)=2.18% which is quite close to the AFR of the healthy components, but it masks the problem of the components using firmware version B. Therefore, in addition to computing the EFR and PEFR of the components, it can be useful to compute subset EFR and PEFR values, along the various dimensions the components could be divided. For example, a SEFR and SPEFR can be determined for memory devices, split by: a) DSN memory the memory device is a part of; b) attributes (e.g. pending sector counts, power on hours, bad sector count, temperature, misread count) of the memory device; c) the storage pool the memory device belongs to; d) the firmware version the memory device is using; e) the physical location (site, region) the memory device is in f) the manufacture date, model number, batch, supplier, or "vintage" the memory device is from g) the deployment date or time period (e.g. which device set) h) total level of work load, data operations, or workflows; i) any combination of the above categories (e.g. "the same workload and firmware version", or "within the same site and installation date") as it may be that certain combinations are subject to a higher than expected failure rate.

Processing Failure Data: Based on the observed failures and trends of failures, this can lead to updates of other parameters that control EFR estimation. Several examples will be described. First, as the historic data accumulates, more accurate estimations can be made for whether or not potential failures will become actual failures, leading to better PEFR and SPEFR estimates. Alternatively, as the failure rate increases or decreases, this may lead to adjustments in the recency parameters (which control how much data to collect and analyze), for example as a failure rate increases, the time period over which failures are considered can be shortened while still including the same sample size of failures. In another example, as failure rates decrease or as subset populations change (due to firmware upgrades, hardware retirement or replacement, etc.) the sample size of a subset population may become low enough that failure rate is no longer statistically meaningful (e.g. with a subset population of only 5 members, any single failure would likely lead to an overestimation of the failure rate of that subset). This subset may be excluded or otherwise filtered from reporting or alerting events. In yet another example, since failures are observed only over finite time periods, the EFR is always an estimate of the component's true Failure Rate (FR). Therefore, the probability that the true FR is contained within a certain fixed distance from the EFR will be less than 1. The distance forms an "EFR Range", including numbers above and below the EFR. This probability that the true FR falls within a given EFR range is known as the confidence level. The tighter the interval around the EFR the lower the confidence level, while a wider interval around the EFR range results in a higher confidence level. As part of the processing of failure data to produce an EFR, the FDCM may also compute at least one EFR range. For example, it may compute an EFR range based on a 95% confidence level, a 75% confidence level, and a 50% confidence level.

Evaluating Reliability Metrics: Generally, when a system is initially designed and deployed certain assumptions are made about the reliability of its components. If the assumptions are wrong, this can lead to problems. For example, if the reliability of the components was overestimated, then the system can be much less reliable than anticipated and this could lead to permanent and irrecoverable data loss. On the other hand, if the reliability of the components was underestimated, then the system might be over-engineered for reliability and have unnecessary cost and overhead. For example, the system might have been deployed with 5× replication when 3× would have sufficed. Therefore, periodic evaluation of the component reliability can be used to recover from initial incorrect estimates. From time to time, the system will determine whether the component reliability has deviated substantially enough from initial estimates to cause system health to be endangered or to imply that cost savings could be realized from reducing redundancy levels in the system. To make these determinations, the FDCM first computes at least one: EFR, PEFR, SEFR, SPEFR. For the values computed, the FDCM may then evaluate it as follows: a) the FDCM may consider (S)(P)EFR directly, comparing it to at least one threshold level (which may be a number, a ratio, a percentage of deviation, a magnitude, a z-score, etc.); b) the FDCM may consider one of the bounds of the (S)(P)EFR Range, for example, an upper-bound or a lower-bound, and compare either to at least one threshold level (which may be a number, a ratio, a percentage of deviation, a magnitude, a z-score, or etc.); c) the FDCM may use the (S)(P)EFR together with other inputs into a "system reliability mode." The system reliability model may be a formula, an analytical model, an equation, or a simulation. The system reliability model uses assumptions concerning the components of the system (e.g., MTTF, FR, MTTR, fault tolerance, etc.) and uses these together with an understanding of the system's architecture, design, or configuration to estimate higher-level attributes of the system, such as a "system failure rate", a "system MTBF", a "mean time to data loss", an "expected data loss rate", or other similar metrics. The FDCM can then evaluate whether any of the derived higher-level system attributes have exceeded a threshold level. d) the FDCM may use one of the bounds of the (S)(P)EFR Range together with other inputs into a system reliability model. The process can then evaluate whether any of the derived higher-level attributes of the system have exceeded a threshold level, when one of the bounds of the range is input to the model as if it was the (S)(P)EFR.

Determining Correlations: The FDCM 250 may examine SEFR differences among two or more populations to make inferences concerning the underlying causes or reasons for elevated or attenuated rates of failure. For example, among a population of drives, one subset of the population defined by a different firmware version may have a much higher SEFR. This can indicate that this version of the firmware is faulty or contains a defect that is leading to failures. To make such inferences, the FDCM 250 from time to time looks for outliers with SEFRs significantly higher, or significantly lower compared to average SEFR or the EFR. Sudden changes in the SEFR can also indicated environmental problems. For example, if the SEFR begins to rise suddenly, and the subset is defined by all components at the same physical location (such as a data center), this can indicate an environmental problem, such as abnormal temperature, excess vibration, pollution (e.g. particulate matter), unclean power (stepped power, brown out condition, power surges), inappropriate humidity levels, etc. When the FDCM 250 notices sudden changes in the EFR, it can begin to take corrective actions.

Producing Corrective Actions: After evaluating reliability metrics and determining correlations described above, the FDCM may identify one or more of the following situations: a) system reliability is too high, b) system reliability is too low, or c) a Subset of the component population has a problem. Depending on the class of error, corrective actions may be taken as follows.

Example Corrective actions when system reliability is too high:
1. Issue alerts that system is configured with excess reliability/redundancy.
2. Reduce replication/mirroring count or enable asynchronous writes and defer syncing.
3. Change IDA Parameters. Initiate an IDA width decrease, reduce the deferred rebuilding threshold, reduce the write threshold, or increase IDA threshold.
4. Change Priorities: reduce the rebuilder priority or increase client priority.
5. Change hardware: permit less reliable memory devices (e.g. desktop drives, refurbished drives) to be used; recover hardware from excess redundancy, and redeploy for extra capacity.

Example Corrective actions when system reliability is too low:
1. Issue alerts that system/data reliability is at risk.
2. Perform diagnostics: analyze potential failures and differentiate the true failures from the suspected ones (e.g. resume quarantined/failed drives).
3. Increase replication/mirroring count, trigger sync, force synchronous writes in mirrored configurations (must write to a certain threshold number of mirrors to consider it a successful write).
4. Change IDA Parameters. Initiate an IDA width increase; adapt to extra-wide (IDA Width>Number of Devices, i.e. Multiple Pillars per Store/Concentrated Dispersal) configuration; increase write threshold; increase the deferred rebuilding threshold; reduce IDA Threshold. An example of changing IDA parameters is described in more detail below.
5. Change Priorities: increase the prioritization of rebuilding activity; increase the prioritization of sync activity; decrease client priority; defer system maintenance activities that take resources from rebuilding (e.g. rebalancing, reallocation, upgrade, compaction).
6. Change hardware (require more reliable memory devices (e.g. initiate replacement of low reliability sub-populations of drives)); deploy extra hardware to increase the redundancy of the system (i.e. as part of width increase).

Example Corrective actions when a subset of the population has a problem:
1. When the subset is of a certain component type: initiate a replacement of the subset of components: issue alerts about the suspected bad batch/model/set of components; initiate a data migration to move data off of the affected components.
2. When the subset is of a certain software/firmware version: initiate upgrade or downgrade of the affected software/firmware to a non-affected version.
3. If no suitable software/firmware is available: replace the component; take corrective actions that might be taken when system reliability is too low; initiate a data migration to move data off of the affected software/firmware version.
4. When the subset is of a certain workload or workflow: initiate alerts of a potentially damaging workload; throttle, restrict, reduce, redirect, schedule, or delay the requests causing damage to the components; reprioritize tasks to reduce the impact of the workload.
5. When the subset contains common or similar attributes: set the attribute as an indicator for predicting higher failure rates in other populations.
6. When the subset is associated with a physical location: monitor/review/analyze environmental conditions at that location; redirect requests away from that location to others; initiate a migration of components, or their data, from that location to others. As estimated levels of reliability deviate more and more from the required or expected levels of reliability, increasingly drastic changes may be initiated. For example, from minor changes like a slight reduction in client priority to give more to rebuilding, to more severe actions, like entirely stopping the client and other maintenance activities to allow rebuilding to continue at a maximum rate.

Evaluating Results of Actions: After corrective actions have been taken, the FDCM 250 monitors the effects of those changes on the system. From time to time it will re-evaluate the reliability metrics of the system, based on (S)(P)EFR, (S)(P)EFR Range, and System Reliability Models. If it determines that sufficient corrective actions have been taken, the FDCM will take no action and continue to monitor the system and estimates of the ERF. If the FDCM 250 determines that its actions have overcorrected the problem (or later reductions in the (S)(P)EFR, (S)(P)EFR Range, and System Reliability Models estimates lead to an overly healthy system) then it can relax or rollback some of the corrective actions it has taken. However, if it is determined that it has not taken sufficient measures to correct the system reliability it may perform more drastic corrective actions. In all cases, the FDCM 250 continues to collect failure data, and refine its current estimates of the (S)(P)EFR, (S)(P)EFR range, and system reliability models estimates.

FIGS. 6A through 6C illustrate an example of corrective actions to balance system reliability and efficiency, specifically changing IDA parameters and rebuilder priorities. FIG. 6A illustrates an example of data components of the dispersed storage network (DSN) system 412 shown in FIG. 4. The DSN system 412 includes a device set of DSN memory 610 that includes 6 dispersed storage units (DU) 612 numbered DU1 through DU6. In this example, each DU 612 has 6 memory devices for a total of 36 memory devices in the device set 610. The DSN system 412 further includes Information Dispersal Algorithms (IDAs) in IDA block 614 that separate data into unrecognizable slices and stored in DSN memory via internet connections to various storage locations such as device set 610. No single entire copy of the data resides in one location, and only a subset (referred to as the "threshold") of the memory devices for a storage location (column) needs to be available to fully retrieve all of the data. The IDAs 612 use IDA parameters 616 received from the FDCM 250 as described further below. The DSN system 612 also includes a rebuilder 618 and an accessor device 620. The accessor device 620 is an access server that is used to slice, read, write and rebuild the data on the DSN system 412. The rebuilder 618 may be considered part of the accessor device 620.

The rebuilder 618 in FIG. 6A is the self-healing operation of the DSN system 612. The rebuilder 618 runs continuously to maintain data integrity by correcting integrity issues as they arise (network outage, hardware or disk failure, and so on) long before data loss occurs. The rebuilder 618 detects and corrects missing slices, outdated slices and corrupted slices from the data on corresponding slices. If a slices fails to be written because the DU 612 or its drive (memory device) is offline at the time of write, but there are at least a threshold (TH) number of slices written, the data can still be read by a client. However, the rebuilder rewrites failed written slices in their original storage location when the DU or its memory device are back online, such that in the future if other DUs becomes offline, there will still be sufficient slices (at least TH number of slices) to read the data. In FIG. 6A, the rebuilder 618 is currently rebuilding two memory devices as indicated by the arrows from the rebuilder 618.

Again referring to FIG. 6A, in the illustrated example, the IDA parameters 616 include width (W), write threshold (WT), read threshold (or threshold, TH). The IDA parameters 616 are often given in a format of IDA W/TH/WT. For example, IDA W=6/TH=3/WT=4. Width is also referred to as the vault width. In dispersed object storage, an object (or any data file) is sliced (cut) into a WIDTH number of slices, but only need TH number of slices to recover the original data. Each slice is stored in one DU. Typically, a WT number of slices are written into WT number of DUs to generate enough extra copies of data to ensure that TH amount of slices are available at any given time to recover the original object, i.e. read the object successfully. When the system is not so busy, and the system is in perfect health, the accessor device 620 will attempt to write WT number of slices. On the other hand, when the system is in a perfect health, all storage servers are healthy, the system need only write WT number of slices. On the other hand, when the system is not that healthy, i.e. some of the storage server contains some bad drives or memory device, the system will write as many slices as possible because some of them may not be able to successfully write where some memory devices are offline.

FIG. 6A illustrates the beginning state of an example of the FDCM 250 taking corrective actions to balance system reliability and efficiency. In the beginning state, it is assumed that the FDCM 250 detects a high EFR or actual failure rate in the device set 610 where 6 of the 36 devices have recently been detected as unhealthy indicated by the units with a hatched pattern. The rebuilder is currently rebuilding two slices at a low rate such as 100 objects per second. The DSN memory is currently using an IDA parameter of W=6/TH=3/WT=4 as described above. FIG. 6B illustrates a subsequent point in time where the accessor 620 is attempting to write an object 622 in the last column of the device set 610 which already had two unhealthy memory devices as described above. A third device fail 624 in the group of memory devices results in the number of healthy devices for the write (3) less than the write threshold (WT=4) which means the write will fail. When the FDCM 250 detects the write fail or predicts such a write fail may occur when system reliability is too low, the FDCM 250 may take corrective action.

FIG. 6C illustrates two possible corrective actions the FDCM 250 may take in the situation described with reference to FIG. 6B. The first possible corrective action is to increase the width of the device set 612 by adding an additional DS unit from possible DSN memory and adding it to this device set as DU7 626. This is done by sending new IDA parameters 616 from the FDCM 250 to the accessor device 620. In this example, the new IDA parameters would be W=7/TH=3/WT=4 to increase the redundancy factor of the storage to WT/TH=7/3=2.33. The second possible corrective action is to increase the rebuild rate 626 of the rebuilder 618. For example, the rebuild rate could be increased from 100 objects per second to 200 objects per second which as a tradeoff would likely also reduce the write throughput.

The above example illustrated possible corrective action when detecting the failure rate is too high. In contrast, when detecting a failure rate that is low, the FDCM 250 could take the opposite correction action as described in the example above. For example, when the failure rate is low, the FDCM 250 could decrease the width of the device set from seven down to six. This action would be equivalent to going from FIG. 6C to FIG. 6B. Similarly, the FDCM 250 could decrease the rebuild rate to save resources.

FIGS. 7A-7C illustrate examples of taking corrective action on a dispersed storage network system as described above. FIG. 7A illustrates examples of corrective action when the reliability is high. FIG. 7B illustrates corrective action when reliability is low. FIG. 7C illustrates corrective action when a subset of the population has a problem.

Referring to FIG. 8, a method 800 shows one suitable example for detecting failures in a distributed computing system caused by hardware, software, workflow, deployment, or environmental factors in a component of the computing system. Method 800 is preferably performed by FDCM 250, the accessor device 620 and by other components of the dispersed storage network system 412 in FIG. 6. First, monitor component performances to collect failure data (step 810). Then organize and process monitored failure data and estimated failures for components (step 820). Evaluate reliability metrics (step 830). Determine correlations (step 840). Then produce corrective actions to balance system reliability and efficiency (step 850). The method is then done.

FIG. 9 shows one suitable example of a method 900 for organizing and processing monitored failure data and estimated failures for components. Method 900 thus shows suitable steps for step 820 in FIG. 8. First, group components into sets (step 910). Next, evaluate failure rates (estimated and actual) for component sets (step 920). When system reliability is low or other appropriate circumstances, take corrective action on a single component set (step 930). Then the method is then done.

FIG. 10 shows one suitable example of a method 1000 for evaluating reliability metrics and producing corrective actions to balance system reliability and efficiency. Method 1000 thus shows suitable steps for step 850 in FIG. 8. First, send parameters to the information dispersal algorithms block (614 in FIG. 6A) on the dispersed storage network system that indicate changes for separating and storing slices of data in the DUs (step 1010). Then change the rebuild rate for rebuilding data slices on the dispersed storage network system (step 1020). The method is then done.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The disclosure and claims herein describe a failure detection and correction module (FDCM) that uses statistical measurement to detect failures in a distributed computing system and produce corrective actions. Corrective action includes changing slice storing parameters and rebuild priorities on a dispersed storage system.

The claims and disclosure herein support an apparatus comprising at least one processor; a memory coupled to the at least one processor; a failure detection and correction module residing in the memory and executed by the at least one processor that detect failures of a distributed computing system; wherein the failure detection and correction module identifies issues from various components, correlates failures and estimated failures in each level of components, rolls up failures and estimated failures from each level of components to system level estimations of failures, and produces a corrective action to balance reliability and efficiency of the distributed computing system.

The claims and disclosure herein further support a computer-implemented method executed by at least one processor for failure detection and correction on a distributed computing system, the method comprising: monitoring performance of components to collect failure data; organizing and process monitored failure data and estimated failures for the components; evaluating reliability metrics; determining correlations; and producing corrective actions to balance reliability and efficiency of the distributed computing system.

The claims and disclosure herein further support a computer-implemented method executed by at least one processor for failure detection and correction on a distributed computing system, the method comprising: monitoring performance of components to collect failure data; organizing and process monitored failure data and estimated failures using statistical measurement to detect issues for the components and estimating failures in each level of components and rolls failures up to system level estimations; evaluating reliability metrics; determining correlations; and producing corrective actions to balance reliability and efficiency of the distributed computing system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for failure detection and correction on a distributed computing system, the method comprising:
   monitoring performance of components;
   responsive to an increase in failure rate among at least some of the components, shortening a time window parameter corresponding to a length of time for collecting failure data for the at least some of the components with the increased failure rate;
   collecting monitored failure data from the components based, at least in part, on the time window parameter;
   organizing and processing monitored failure data and estimated failures for the components;
   evaluating reliability metrics;
   determining correlations; and
   producing corrective actions to balance reliability and efficiency of the distributed computing system;
   wherein:
   the corrective actions include sending parameters to information dispersal algorithms on a dispersed storage network system that indicate changes for separating and storing slices of data on the dispersed storage network system; and
   the parameters indicate to modify a width of a storage device set on the dispersed storage network.

2. The method of claim 1 further comprising using statistical measurement to detect issues in a component of the distributed computing system.

3. The method of claim 1 further comprising estimating failures in each level of components and rolls failures up to system level estimations.

4. The method of claim 1 wherein the step of organizing and processing monitored failure data and estimated failures for the components further includes:
   grouping components into sets;
   evaluating failure rates for component sets; and
   taking corrective action on a single component set.

5. The method of claim 1 wherein the corrective action further includes changing a rebuild rate for rebuilding slices on the dispersed storage network system.

6. The method of claim 5 wherein the corrective action further includes increasing the rebuild rate when reliability of the dispersed storage network system is low.

7. A computer program product (CPP) for failure detection and correction on a distributed computing system, the CPP comprising:
   a machine readable storage device; and
   computer code stored on the machine readable storage device, with the computer code including instructions for causing a processor(s) set to perform operations including the following:
   monitoring performance of components,
   responsive to an increase in failure rate among at least some of the components, shortening a time window parameter corresponding to a length of time for collecting failure data for the at least some of the components with the increased failure rate,
   collecting monitored failure data from the components based, at least in part, on the time window parameter,
   organizing and processing monitored failure data and estimated failures for the components,
   evaluating reliability metrics,
   determining correlations, and
   producing corrective actions to balance reliability and efficiency of the distributed computing system;
   wherein:
   the corrective actions include sending parameters to information dispersal algorithms on a dispersed storage network system that indicate changes for separating and storing slices of data on the dispersed storage network system; and
   the parameters indicate to modify a width of a storage device set on the dispersed storage network.

8. The CPP of claim 7 wherein the computer code further includes instructions for causing the processor(s) set to perform the following operations:
   using statistical measurement to detect issues in a component of the distributed computing system.

9. The CPP of claim 7 wherein the computer code further includes instructions for causing the processor(s) set to perform the following operations:
   estimating failures in each level of components and rolls failures up to system level estimations.

10. The CPP of claim 7 wherein the step of organizing and processing monitored failure data and estimated failures for the components further includes:
    grouping components into sets;
    evaluating failure rates for component sets; and
    taking corrective action on a single component set.

11. The CPP of claim 7 wherein the corrective action further includes changing a rebuild rate for rebuilding slices on the dispersed storage network system.

12. The CPP of claim 11 wherein the corrective action includes increasing the rebuild rate when reliability of the dispersed storage network system is low.

13. A computer system (CS) for failure detection and correction on a distributed computing system, the CS comprising:
- a processor(s) set;
- a machine readable storage device; and
- computer code stored on the machine readable storage device, with the computer code including instructions for causing the processor(s) set to perform operations including the following:
  - monitoring performance of components,
  - responsive to an increase in failure rate among at least some of the components, shortening a time window parameter corresponding to a length of time for collecting failure data for the at least some of the components with the increased failure rate,
  - collecting monitored failure data from the components based, at least in part, on the time window parameter,
  - organizing and processing monitored failure data and estimated failures for the components,
  - evaluating reliability metrics,
  - determining correlations, and
  - producing corrective actions to balance reliability and efficiency of the distributed computing system;
- wherein:
- the corrective actions include sending parameters to information dispersal algorithms on a dispersed storage network system that indicate changes for separating and storing slices of data on the dispersed storage network system; and
- the parameters indicate to modify a width of a storage device set on the dispersed storage network.

14. The CS of claim 13 wherein the computer code further includes instructions for causing the processor(s) set to perform the following operations:
- using statistical measurement to detect issues in a component of the distributed computing system.

15. The CS of claim 13 wherein the computer code further includes instructions for causing the processor(s) set to perform the following operations:
- estimating failures in each level of components and rolls failures up to system level estimations.

16. The CS of claim 13 wherein the step of organizing and processing monitored failure data and estimated failures for the components further includes:
- grouping components into sets;
- evaluating failure rates for component sets; and
- taking corrective action on a single component set.

17. The CS of claim 13 wherein the corrective action further includes changing a rebuild rate for rebuilding slices on the dispersed storage network system.

18. The CS of claim 17 wherein the corrective action includes increasing the rebuild rate when reliability of the dispersed storage network system is low.

* * * * *